(12) United States Patent
Xie et al.

(10) Patent No.: US 11,281,363 B2
(45) Date of Patent: Mar. 22, 2022

(54) METHOD AND DEVICE FOR SETTING IDENTITY IMAGE

(71) Applicant: Beijing Xiaomi Mobile Software Co., Ltd., Beijing (CN)

(72) Inventors: Yan Xie, Beijing (CN); Yue Cheng, Beijing (CN); Liang Wei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 265 days.

(21) Appl. No.: 15/618,962

(22) Filed: Jun. 9, 2017

(65) Prior Publication Data
US 2017/0371525 A1  Dec. 28, 2017

(30) Foreign Application Priority Data
Jun. 23, 2016 (CN) .......................... 201610466306.5

(51) Int. Cl.
| | |
|---|---|
| *G06F 3/0484* | (2013.01) |
| *G06F 16/54* | (2019.01) |
| *G06T 13/80* | (2011.01) |
| *G06F 3/04845* | (2022.01) |
| *G06F 3/04847* | (2022.01) |

(52) U.S. Cl.
CPC ...... *G06F 3/04845* (2013.01); *G06F 3/04847* (2013.01); *G06F 16/54* (2019.01); *G06T 13/80* (2013.01); *G06T 2200/24* (2013.01)

(58) Field of Classification Search
CPC .. G06F 16/54; G06F 3/04845; G06F 3/04847; G06F 16/535; G06F 16/53; G06F 16/55; G06T 13/80; G06T 2200/24
See application file for complete search history.

(56) References Cited

U.S. PATENT DOCUMENTS

| | | | |
|---|---|---|---|
| 8,867,849 B1 | 10/2014 | Kirkham et al. | |
| 9,275,420 B1* | 3/2016 | Fredinburg | ........... G06F 3/0481 |
| 9,424,491 B1 | 8/2016 | Kirkham et al. | |
| 9,817,625 B1* | 11/2017 | Chun | .................. G06F 16/5866 |

(Continued)

FOREIGN PATENT DOCUMENTS

| | | |
|---|---|---|
| CN | 104951500 A | 9/2015 |
| CN | 105069073 A | 11/2015 |

(Continued)

OTHER PUBLICATIONS

Notification of the First Office Action (including English translation) of Chinese application No. 201610466306.5, dated Jan. 11, 2019, 24 pages.

(Continued)

*Primary Examiner* — Chau T Nguyen
(74) *Attorney, Agent, or Firm* — Arch & Lake LLP

(57) ABSTRACT

Methods are devices are provided for setting an identity image of an account. In the method, an identity image setting operation for a target account is detected; an identity image set is displayed in response to detection of the identity image setting operation, the identity image set including at least one identity image to be selected; selection operation over the identity image to be selected is detected; and an identity image of the target account is set in response to detection of the selection operation according to a target image indicated by the selection operation.

20 Claims, 10 Drawing Sheets

(56) References Cited

U.S. PATENT DOCUMENTS

| | | | |
|---|---|---|---|
| 2005/0111737 A1* | 5/2005 | Das | G06F 16/54 |
| | | | 382/190 |
| 2008/0205772 A1* | 8/2008 | Blose | G06F 16/51 |
| | | | 382/225 |
| 2008/0209339 A1* | 8/2008 | Macadaan | G06F 16/252 |
| | | | 715/745 |
| 2009/0251484 A1 | 10/2009 | Zhao et al. | |
| 2011/0029522 A1* | 2/2011 | Tyagi | G06F 16/58 |
| | | | 707/737 |
| 2013/0141456 A1* | 6/2013 | Sokolov | G06F 3/14 |
| | | | 345/620 |
| 2014/0280565 A1* | 9/2014 | Grewal | H04L 67/306 |
| | | | 709/204 |
| 2014/0292768 A1* | 10/2014 | Tobin | G06T 13/80 |
| | | | 345/473 |
| 2015/0213001 A1* | 7/2015 | Levy | H04L 51/32 |
| | | | 715/202 |
| 2015/0254281 A1* | 9/2015 | Sauve | G06F 16/5866 |
| | | | 348/239 |
| 2016/0042225 A1* | 2/2016 | Barak | G06F 16/583 |
| | | | 382/118 |
| 2017/0169570 A1* | 6/2017 | Vashishtha | G06K 9/6215 |
| 2018/0101774 A1* | 4/2018 | Werris | H04W 4/80 |
| 2018/0232562 A1* | 8/2018 | Cambor | G06K 9/00288 |
| 2018/0253596 A1* | 9/2018 | Barman | G06K 9/00369 |
| 2018/0285357 A1* | 10/2018 | Chang | G06K 9/00677 |
| 2019/0102339 A1* | 4/2019 | Wang | G06F 16/176 |

FOREIGN PATENT DOCUMENTS

| | | |
|---|---|---|
| CN | 105100244 A | 11/2015 |
| CN | 105657121 A | 6/2016 |
| CN | 105701245 A | 6/2016 |
| WO | 2014176773 A1 | 11/2014 |

OTHER PUBLICATIONS

English translation of the International Search Report in international application No. PCT/CN2016/096714, dated Jan. 24, 2017, 2 pages.

English translation of the Written Opinion of the International Search Authority in international application No. PCT/CN2016/096714, dated Jan. 24, 2017, 4 pages.

International Search Report issued in corresponding International Application No. PCT/CN2016/096714, dated Jan. 24, 2017, 5 pages.

Written Opinion of the International Search Authority issued in corresponding International Application No. PCT/CN2016/096714, dated Jan. 24, 2017, 4 pages.

Supplementary European Search Report in connection with EP No. 17177169.4, dated Sep. 29, 2017, 14 pages.

Google+: "Google+ profile animated gif", Mar. 25, 2013 (Mar. 25, 2013), XP055406804,Retrieved from the Internet URL:https://plus.google.com/+googleplus/posts/FAUcRGZFGJH, 1 page.

* cited by examiner

METHOD AND DEVICE FOR SETTING IDENTITY IMAGE

CROSS-REFERENCE TO RELATED APPLICATION

This application is filed based upon and claims priority to Chinese Patent Application No. 201610466306.5, filed on Jun. 23, 2016, the entire contents of which are incorporated herein by reference.

TECHNICAL FIELD

The present disclosure generally relates to the technical field of computer communication, and more particularly, to a method and device for setting an identity image.

BACKGROUND

Along with development of a computer communication technology, there emerges so much application software which may bring convenience to people's work and lives. In a related technology, a user may use a related social network application such Facebook®, Twitter®, Microblog/Weibo®, WeChat®, MiTalk, Callshow and the like, and set identity information of an account, for example, adding a portrait, a personal photo or a short film. After finishing setting, a user terminal may automatically synchronize the identity information to all contacts of the application.

However, setting the identity information in the related technology requires the user to manually select a photo from an album on her/his terminal, or instantly take a photo or search for/shoot a short film, which is troublesome in operation and low in efficiency, causing many users unwilling to actively set identity information of application accounts, so that communication implemented through the application is tedious and uninteresting, and influences communication experience of the user.

SUMMARY

According to a first aspect of the present disclosure, a method for setting an identity image of an account is provided, which may include: detecting identity image setting operation for a target account; displaying an identity image set in response to detection of the identity image setting operation, wherein the identity image set comprises at least one identity image to be selected; detecting selection operation over the at least one identity image to be selected; and setting, in response to detection of the selection operation, an identity image of the target account according to a target image indicated by the selection operation.

According to a second aspect of the present disclosure, a device for setting an identity image of an account is provided, which may include: a processor and a memory for storing instructions executable by the processor. The processor is configured to: detect identity image setting operation for a target account; display an identity image set in response to detection of the identity image setting operation, the identity image set comprising at least one identity image to be selected; detect selection operation over the identity image to be selected; and set, in response to detection of the selection operation, an identity image of the target account according to a target image indicated by the selection operation.

According to a third aspect of the present disclosure, there is provided a non-transitory computer-readable storage medium having stored therein instructions that, when executed by a processor of a user terminal, causes the user terminal to perform a method for setting an identity image of an account, the method comprising: detecting identity image setting operation for a target account; displaying an identity image set in response to detection of the identity image setting operation, wherein the identity image set comprises at least one identity image to be selected; detecting selection operation over the at least one identity image to be selected; and setting, in response to detection of the selection operation, an identity image of the target account according to a target image indicated by the selection operation.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Terms adopted in the present disclosure are intended not to limit the present disclosure but to describe specific embodiments. "A," "said," and "the" representing a singular form in the present disclosure and the appended claims are also intended to include a plural form unless other meanings are clearly represented in the context. It should also be understood that the term "and/or" in the present disclosure refers to and includes any one or any possible combination of one or more associated items which are listed.

It should also be understood that terms first, second, third and the like may be adopted to describe various kinds of information in the present disclosure, but these information should not be limited to these terms. These terms are only adopted to distinguish the same type of information. For example, without departing from the scope of the present disclosure, first information may also be called second information, and similarly, second information may also be called first information. It depends on the context. For example, the term "if" used here may be explained as "when . . . " or "while . . . " or "in response to determination."

In the embodiments of the present disclosure, an involved execution body includes: a user terminal and a server. The user terminal may be electronic equipment such as a smart phone, a Personal Digital Assistant (PDA), a tablet computer and wearable equipment. The server may be equipment such as an application server and a router. In a specific implementation process, the user terminal and the server are independent of each other, and also keep in contact with each other to implement the technical solutions provided by the embodiment of the present disclosure together. In order to facilitate description, the embodiment of the present disclosure will be introduced below from the angle of the user terminal.

Figure 1:
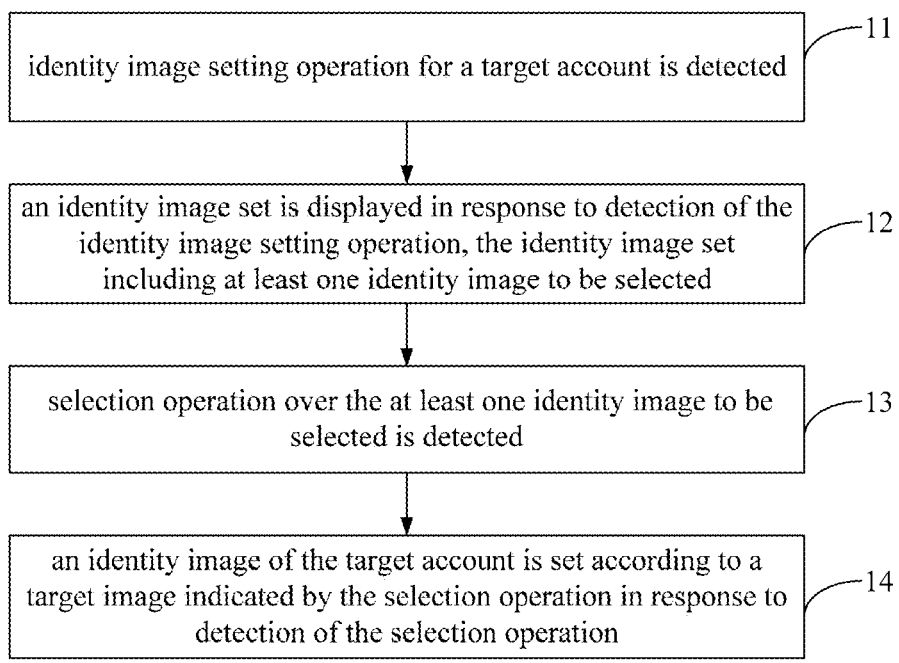
FIG. 1 is a flow chart showing a method for setting an identity image of an account, according to an exemplary embodiment of the present disclosure.

FIG. 1 is a flow chart showing a method for setting an identity image of an account, according to an exemplary embodiment of the present disclosure. The method may include the following steps.

Step 11: identity image setting operation for a target account is detected.

In the embodiment of the present disclosure, a user may implement communication through client software installed on a user terminal. Specifically, after logging in application software (APP) by virtue of account information, the user may browse a display interface of the application. In the related technology, many applications have user identity image setting interfaces, such as an icon setting interface in a phone contact information setting, portrait setting interfaces in social network applications MiTalk, WeChat® and QQ®, and a portrait setting webpage in a personal show platform of a social website such as Microblog. The target account in the embodiment of the present disclosure may be an account of any application in which the user logs by virtue of the user terminal.

It is supposed that an identity image setting interface of the target account is a portrait setting interface of an account in application MiTalk. In the embodiment of the present disclosure, if the user terminal is terminal equipment with a touch display screen, such as a smart phone, then action information triggered by the user may be sensed through a pressure sensor, a heat-sensitive sensor, an infrared sensor and the like of the touch display screen. The action information may be a touch action of the user on the display screen, or may be action information which may be sensed by the user terminal such as a gesture action performed over the display screen by the user. If the user terminal is terminal equipment such as a desktop computer or a notebook computer, then action information triggered by the user with a mouse on a display interface may be detected.

Step 12: an identity image set is displayed in response to detection of the identity image setting operation, the identity image set including at least one identity image to be selected.

During initial setting of an application, there is usually set an action information list, which may include a corresponding relationship between action information and an operation instruction. An example of the action information list is shown in Table 1:

TABLE 1

| Action information | Operation instruction |
| --- | --- |
| One-click in a portrait setting area | Viewing an enlarged portrait view |
| Double-click in a portrait setting area | Setting a portrait |

After the user terminal detects the action information triggered by the user, the action information list is queried to determine a corresponding operation instruction. Referring to Table 1, if preset action information corresponding to the operation instruction "setting a portrait" is "double-click in a portrait setting area," when the user terminal detects a double-click action triggered by the user in the portrait setting area, a portrait setting operation instruction is generated. In the embodiment of the present disclosure, the portrait setting operation instruction may have two types: a portrait addition instruction and a portrait updating instruction. If a setting state of a portrait of the current account is "unset," the portrait addition instruction is generated; and if the setting state of the portrait of the current account is "set," the portrait updating instruction is generated.

The user terminal displays the identity image set according to the portrait setting instruction. The identity image set includes at least one identity image to be selected for the user to select a satisfied image from the identity image set as an identity image of the MiTalk account.

Here, it is to note that the identity image to be selected in the embodiment of the present disclosure may include any image, which is not limited to a photo of the user, but may be an image such as a scenery picture or a cartoon.

Figure 2:
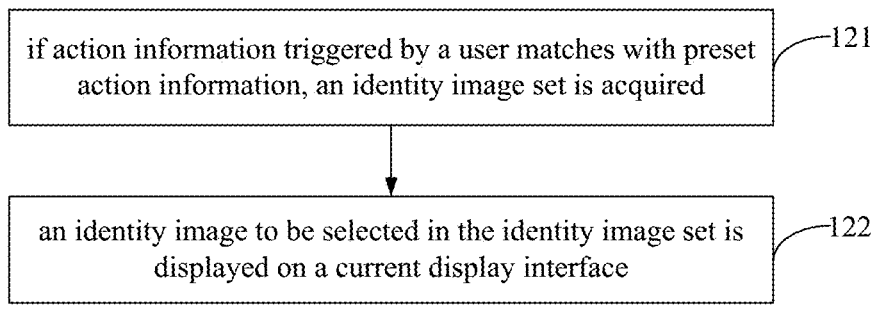
FIG. 2 is a flow chart showing another method for setting an identity image of an account, according to an exemplary embodiment of the present disclosure.

FIG. 2 is a flow chart showing another method for setting an identity image of an account, according to an exemplary embodiment. Referring to FIG. 2, step 12 may include the following steps.

Step 121: if the action information triggered by the user matches with preset action information, then the identity image set is acquired, the identity image set including at least one identity image to be selected.

In the embodiment of the present disclosure, at least one of the following implementation modes may be adopted to acquire the identity image set according to a source of the identity image set.

In a first implementation mode, a local image database is queried to acquire an identity image set.

Figure 3A:
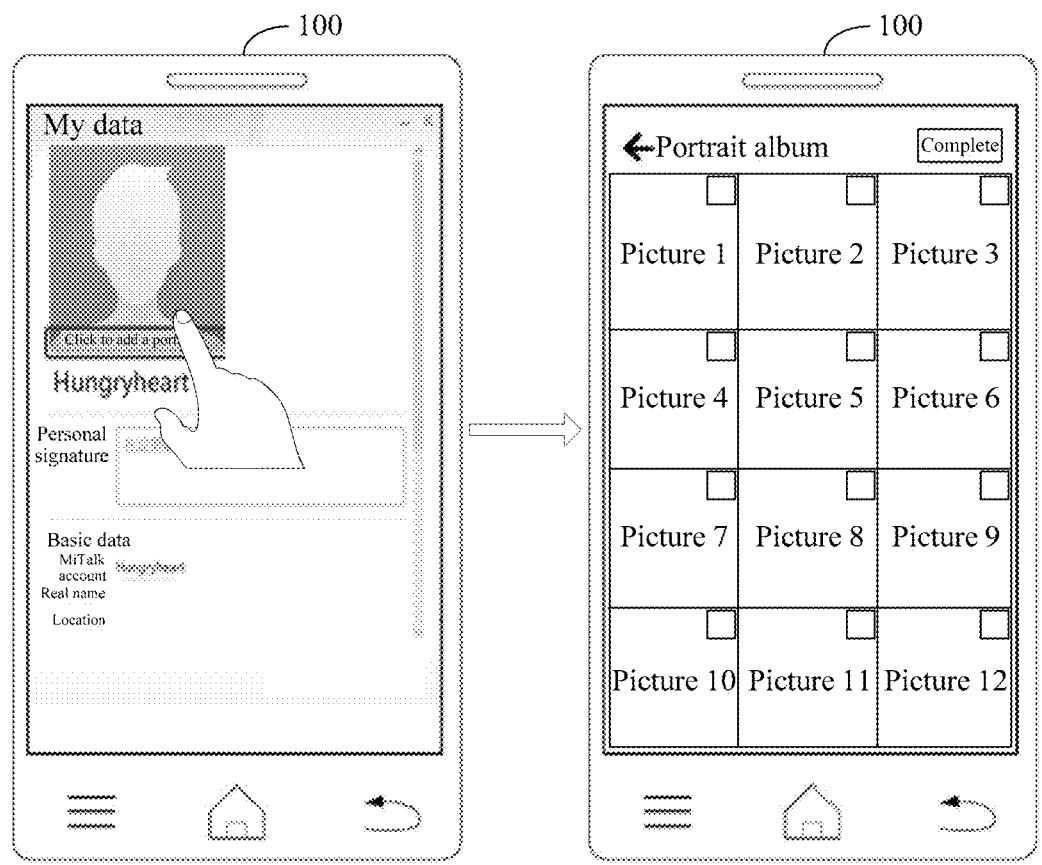
FIG. 3A is a diagram of an application scenario of setting an identity image of an account, according to an exemplary embodiment of the present disclosure.

The user terminal includes a set of images used as identity images in the locally stored image database, such as a folder named after a "portrait album" in a photo library of a smart phone. FIG. 3A is a diagram of an application scenario according to an exemplary embodiment. Referring to FIG. 3A, it is supposed that the target account is a MiTalk account named after "Hungryheart." When the user terminal detects a double-click action triggered by the user in the portrait setting area, the local image database is queried to acquire and display the identity image set named after the "portrait album."

The identity image set may be an image set formed by a selected type of pictures which may be used as identity images after the images in the photo library are classified by the user, or may be an image set formed by automatically clustering the images in the photo library by the user terminal in a machine learning manner. Detailed introductions will be subsequently given.

In another embodiment of the present disclosure, the identity images to be selected in the locally stored image identity set may be images acquired in various manners, for example, images acquired by the user terminal, and identity images downloaded from corresponding application servers when the user logs in various applications with the user terminal.

In a second implementation mode, an identity image set is acquired from an application server of the target account.

Figure 3B:
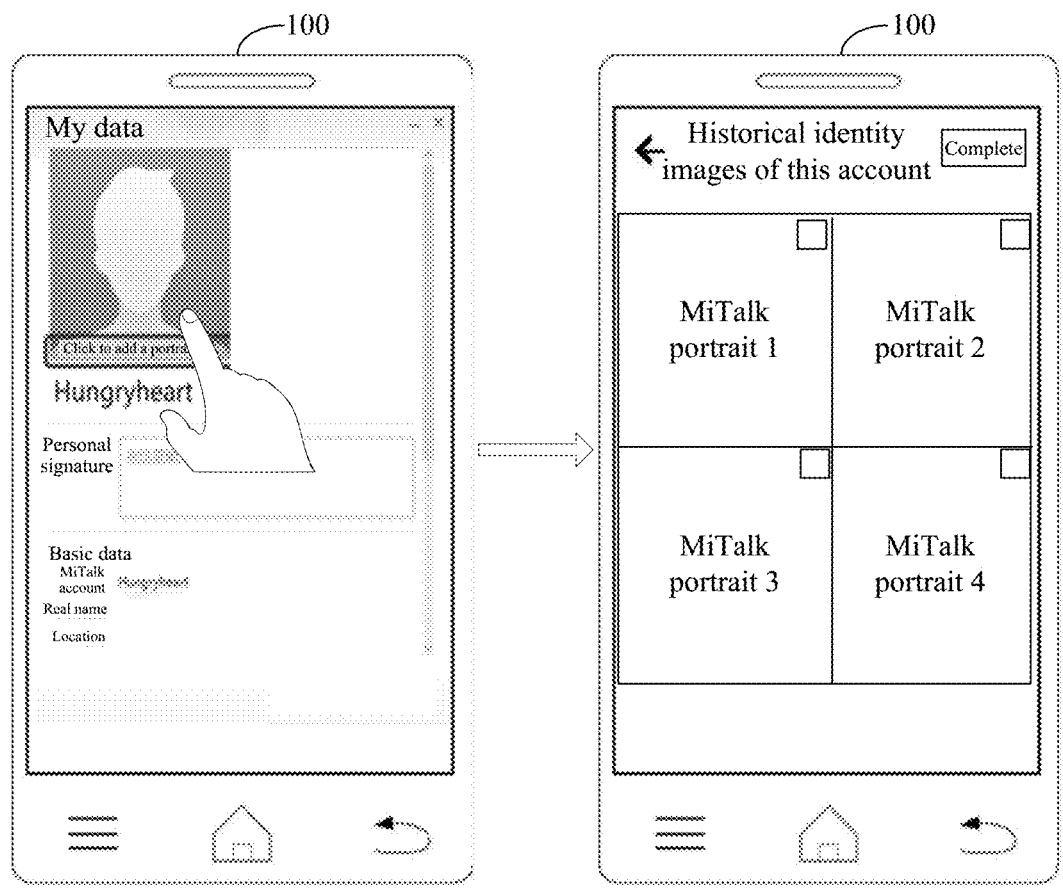
FIG. 3B is a diagram of another application scenario of setting an identity image of an account, according to an exemplary embodiment of the present disclosure.

Identity images to be selected in the identity image set acquired in such a manner are historical identity images used by the user before. FIG. 3B is a diagram of another application scenario according to an exemplary embodiment. Referring to FIG. 3B, it is still supposed that the target account is a MiTalk account Hungryheart. In a process of using the MiTalk application by the user, a remote MiTalk application server may record all or part of identity images used for Hungryheart to form a historical identity image set of the MiTalk account. When receiving a request of setting an account portrait from the user terminal, the MiTalk application server sends the historical identity image set corresponding to the MiTalk account Hungryheart for the user terminal to display the historical identity images used for Hungryheart on a current display interface for the user to select a current identity image from the used identity images.

In an example implementation, the user terminal sends a request to acquire the identity image set when receiving a user operation that triggers setting the portrait of the target account. The request at least includes: information of the target account and a user terminal identifier. After receiving the request, the application server queries an account image information list according to the information of the target account, and determines a storage location of historical identity images of the target account, where the account image information list includes a corresponding relationship between account information and a storage location of a historical identity image. The application server acquires a historical identity image set corresponding to the target account from the storage location, and sends the historical identity image set to the user terminal through a network according to the user terminal identifier for the user terminal to locally display the historical identity image set of the target account for the user to select.

Since the identity image set acquired in such a manner includes the historical identity images used by the target account before and sizes of the images are matched with the size of an identity image setting window, it is not needed to select an image area or regulate the size during subsequent image setting so as to match the size of the identity image setting window. The portrait may be directly set and thus can be completely adapted to the size of the setting window. The convenience and high speed are guaranteed.

In a third implementation mode, an identity image set is acquired from an application server of an associated account of the target account.

In the embodiment of the present disclosure, the associated account of the target account may be an application account which formed a binding relationship with the target account before, or a different application account logged on the same user terminal as the target account, or another account in the same application.

The user terminal may locally store an associated list of the target account, where the associated list includes a corresponding relationship between the target account and an associated account. Under the condition of login of the associated account, the user terminal queries the associated list to determine account information of one or more associated accounts in an association relationship with the target account when receiving an instruction, triggered by the user, of setting the portrait of the target account. The user terminal sends identity image request to the application server of the associated account according to the account information of the associated account. Here, each piece of identity image request may include at least: the account information of the corresponding associated account and the terminal identifier of the user terminal. The application server of an associated account sends an identity image set corresponding to the associated account to the user terminal for display in response to the image request.

Figure 3C:
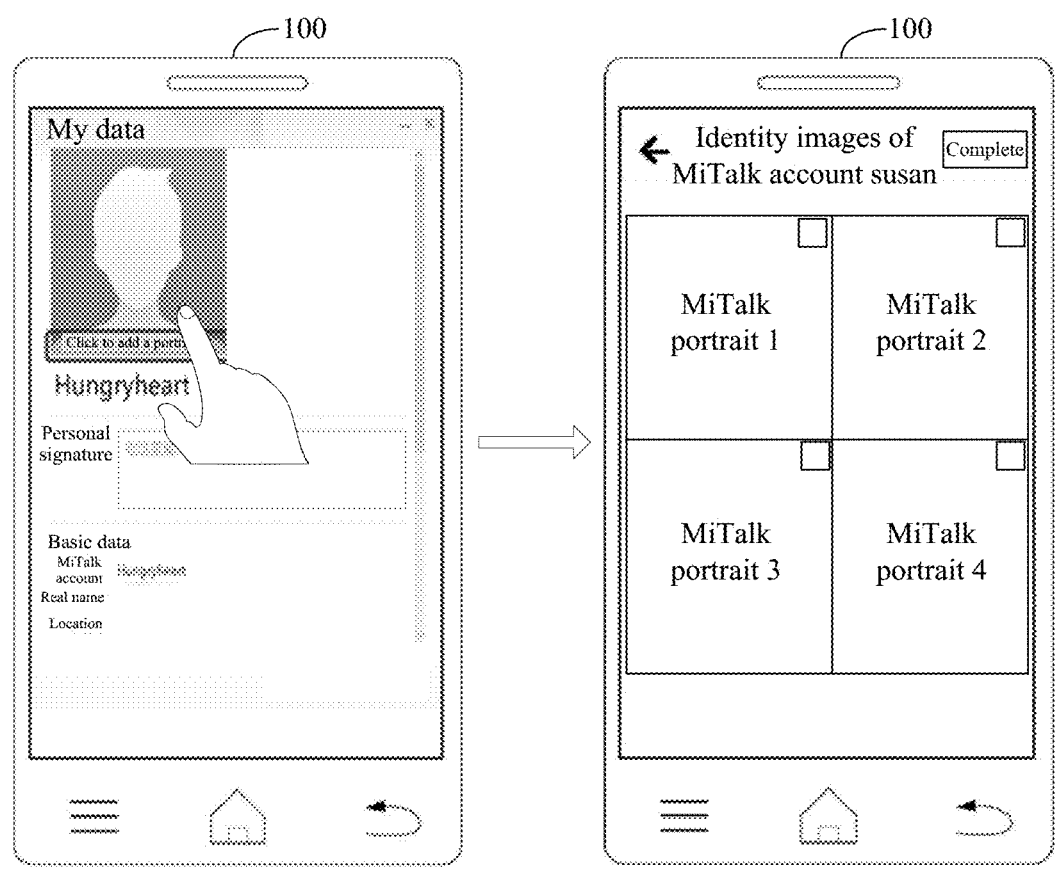
FIG. 3C is a diagram of still another application scenario of setting an identity image of an account, according to an exemplary embodiment of the present disclosure.

FIG. 3C is a diagram of a scenario of setting an identity image of an account, according to an exemplary embodiment. Referring to FIG. 3C, the MiTalk account, i.e. Hungryheart, is still taken as an example, and its associated account may be a MiTalk account Susan ever logged in a mobile phone terminal 100 before. The two accounts may be accounts of two users in an association relationship, such as a spousal relationship and a friend relationship. The two users may have common interests and hobbies, so that the one using the account Hungryheart may be interested in selecting an identity image used by the other one with the account Susan as the identity image of Hungryheart, such as a currently used identity image or a historical identity image of Susan.

Figure 3D:
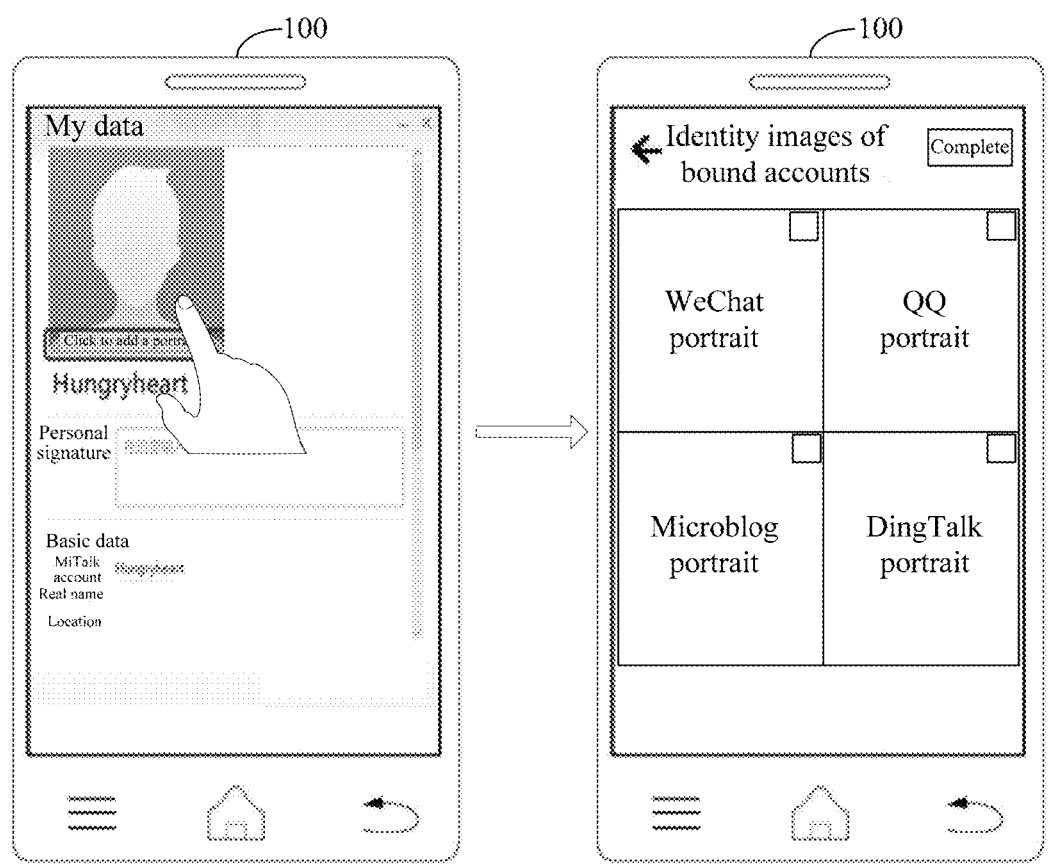
FIG. 3D is a diagram of yet another application scenario of setting an identity image of an account, according to an exemplary embodiment of the present disclosure.

FIG. 3D is a diagram of a scenario of setting an identity image of an account, according to an exemplary embodiment. Referring to FIG. 3D, the associated account of the MiTalk account Hungryheart may also be account information of another application such as a QQ account in a binding relationship with the MiTalk account Hungryheart, wherein the associated account may be an application account which is currently or previously bound with Hungryheart, such as a WeChat® account, a QQ® account, a Microblog account and a DingTalk account.

Step 122: the identity image to be selected in the identity image set is displayed on a current display interface.

Figure 4:
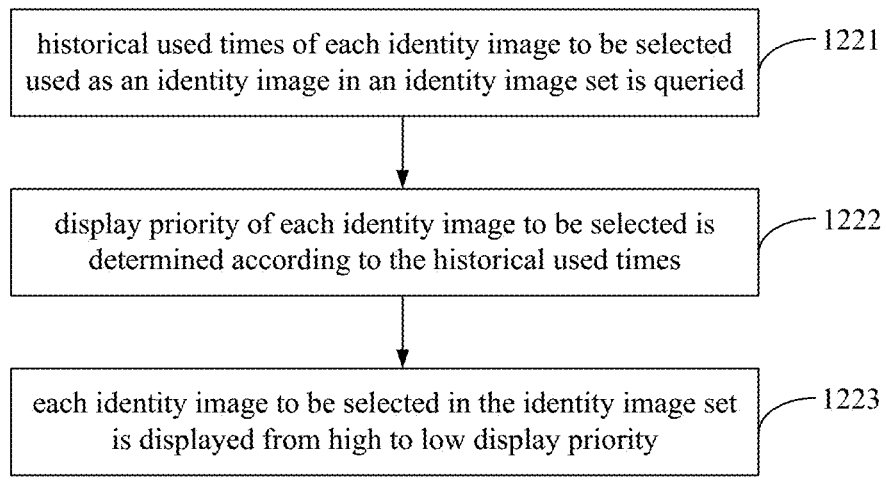
FIG. 4 is a flow chart showing still another method for setting an identity image of an account, according to an exemplary embodiment of the present disclosure.

FIG. 4 is a flow chart showing still another method for setting an identity image of an account, according to an exemplary embodiment. Referring to FIG. 4, step 122 may include the following steps.

Step 1221: historical used times of each identity image to be selected used as an identity image in the identity image set is queried.

In the embodiment of the present disclosure, an image operation record may be queried according to an image identifier of each image in the identity image set, the record including the image identifier and an image operation type. The historical used times of each image used as an identity image may be determined according to the image operation type such as portrait setting, call show setting, and other icon setting. Here, when one or more images are selected in the call show setting, the one or more images may be shown on a second terminal when the second terminal is called by the terminal. For example, a corresponding relationship between an image identifier and a using frequency is represented by Table 2.

TABLE 2

| Image identifier | Used times |
|---|---|
| Pic 1 | 5 |
| Pic 2 | 3 |
| Pic 3 | 2 |
| Pic 4 | 1 |
| Pic 5 | 0 |

In step 1222: display priority of each identity image to be selected is determined according to the historical used times.

As shown in Table 2, each identity image to be selected may be arranged from high to low historical used times, thereby determining the display priority of each identity image to be selected in the identity image set.

Step 1223: each identity image to be selected in the identity image set is displayed from high to low display priority.

In the present disclosure, the terminal may predict that an image with more usage records is an image more preferred by the user. Such an image is accordingly set with higher display priority. Each identity image to be selected is displayed on the display interface of the user terminal from high to low display priority of the identity images to be selected, so that the user may conveniently and rapidly find a satisfied image, thereby saving the selection time and improving user experience.

Step 13: selection operation over the at least one identity image to be selected is detected.

On the display interface of the user terminal, each identity image to be selected is set with an entrance for user operation. For example, the entrance for user operation may be provided at a preset position of an identity image to be selected, such as above or below. The user may select a target image from the identity image set through the entrance for user operation.

Step 14: an identity image of the target account is set according to a target image indicated by the selection operation, in response to detection of the selection operation.

In the present disclosure, the user may select one or more identity images to be selected from the displayed identity image set as the identity image of the target account. For example, when the portrait is set for the target account, one image may be selected. When a call show is set for the target account, one image or more images may be selected. When the call show is set, a display sequence of the multiple target images may be set, and the call show is displayed in an animation form.

Figure 5:
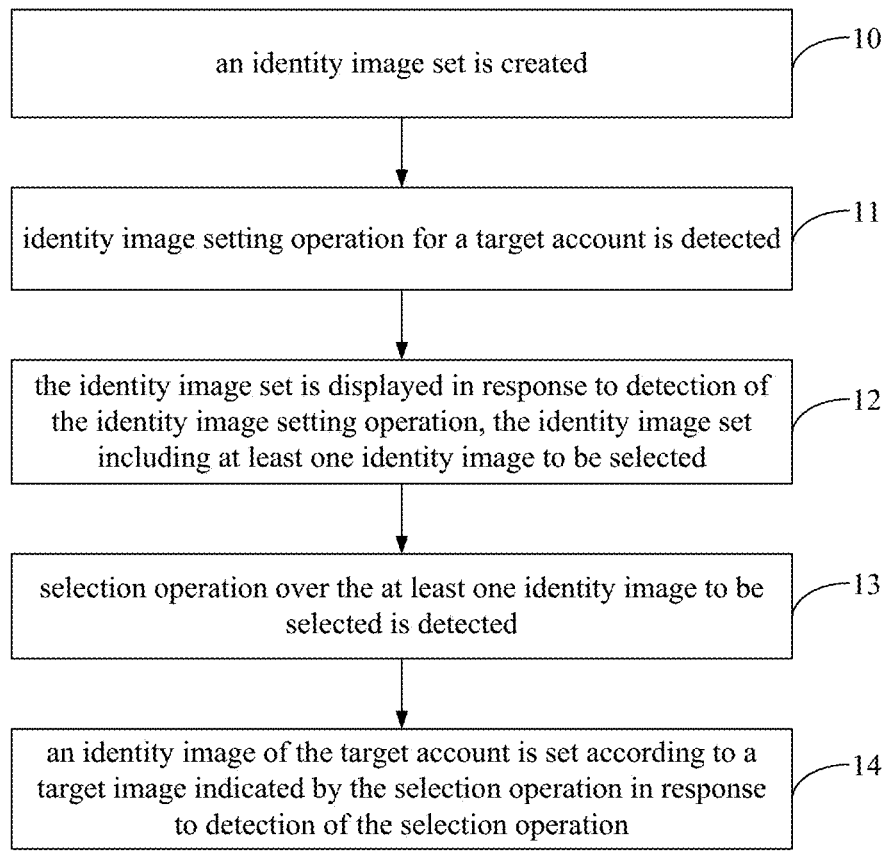
FIG. 5 is a flow chart showing yet another method for setting an identity image of an account, according to an exemplary embodiment of the present disclosure.

FIG. 5 is a flow chart showing yet another method for setting an identity image of an account, according to an exemplary embodiment. Based on the embodiment shown in FIG. 1, before step 11, the method may further include:

Step 10: the identity image set is created.

In the embodiment of the present disclosure, a manner for triggering the user terminal to create the identity image set may include at least one of the following manners.

In a first manner, when it is detected that the user enables a selfie mode, the identity image set is created according to at least one selfie.

When the user terminal detects that the user enables the selfie mode, for example, when it is detected that a front camera of the user terminal is turned on, the identity image set is created according to image information acquired in the selfie mode, and images subsequently acquired in the selfie mode are classified into the identity image set.

In a second manner, when it is detected that the number of similar images in the image database reaches a preset threshold value, the identity image set is created according to the similar images.

The user terminal may regularly run an image recognition program. Alternatively or additionally, the user terminal may run the image recognition program appropriately at other times. For example, the user terminal may select to automatically start the image recognition program after 10 P.M. in an power-on state without affecting the normal usage of the user terminal. The number of the similar images in the local image database is actively analyzed by adopting a face recognition technology. When the number of the similar images in the image database reaches the preset threshold value, for example, a proportion of the number of the similar images to the total number of the images exceeds 50%, it may be determined that the similar images are images of the user or what the user likes. Thus, and the similar images are classified into standby identity images to generate the identity image set of the user. Here, the identity image set mainly includes images of the user.

In a third manner, when the user selects an image as an identity image of an account, the identity image set is created on the basis of the image selected as the identity image.

After the user logs in a certain application on the user terminal, when the user terminal detects the user operation that triggers selecting a local image as an identity image of a user account, the identity image set may be created on the basis of the image. The identity image set is locally stored in the user terminal. When the user subsequently sets an identity image of each application account, the user terminal may classify selected images into the identity image set. That is, the image set includes identity images which have been used or are currently used by the application accounts, wherein each application account is an application account which has ever been logged on the same user terminal. If the user terminal is a mobile phone of user A and user A logged in MiTalk, QQ®, WeChat®, Microblog and the like on the mobile phone, the user terminal may automatically store each identity image used for each application account before to form a locally stored identity image set.

In a fourth manner, the identity image set is created according to a selected image, in response to detection of preset operation for creation of the identity image set.

Such a manner is applicable to a condition of manual operation for creation of the identity image set. The user may select, from the locally stored image database, a picture suitable to be used as an identity image and move or copy it into a preset identity image folder, such as a folder named after the "portrait album," to classify the picture to create the identity image set in a manual operation manner.

The user terminal may locally create the identity image set in any of the abovementioned manners and store it at a specified position. Subsequently, when the user terminal detects the user operation that triggers setting the identity image of the target account, at least one identity image in the identity image set may be acquired and displayed for the user to select. The terminal may select the target image as the identity image of the target account from the displayed identity images. Thus, convenience is brought to operation of the user. Compared with the related technology where files are opened level by level to look for a proper identity image, the disclosed method has the advantages that efficiency of setting an identity image of an account is effectively improved, and an intelligent degree of the user terminal is increased.

For each of the abovementioned method embodiments, for simple description, a series of action combinations are expressed, but those skilled in the art should know that the present disclosure is not limited to a described action sequence because some steps may be executed in another sequence or executed at the same time according to the present disclosure.

Next, those skilled in the art should know that all of the embodiments described in the specification are optional embodiments, and involved actions and modules are not essential to the present disclosure.

Corresponding to the abovementioned method embodiments of implementing an application function, the present disclosure further provides embodiments of a device and a corresponding terminal for implementing an application function.

Figure 6:
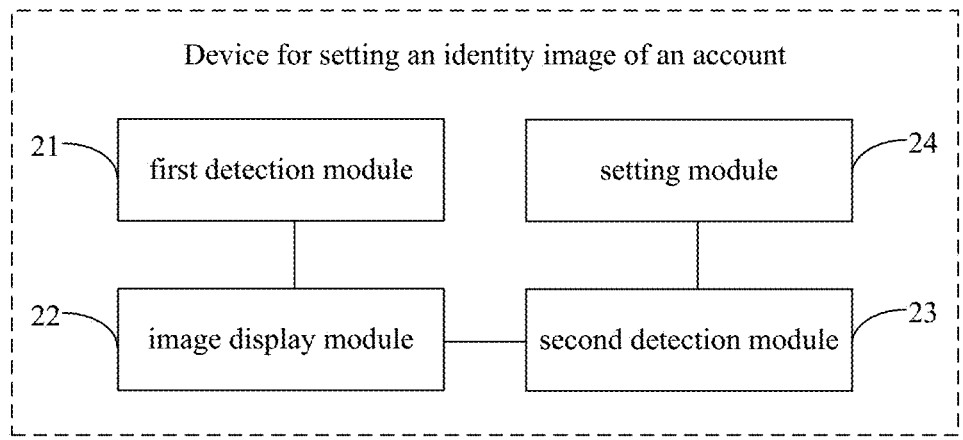
FIG. 6 is a block diagram of a device for setting an identity image of an account, according to an exemplary embodiment of the present disclosure.

FIG. 6 is a block diagram of a device for setting an identity image of an account, according to an exemplary embodiment. The device may include: a first detection module 21, an image display module 22, a second detection module 23, and a setting module 24. The first detection module 21 is configured to detect identity image setting operation for a target account. The image display module 22 is configured to display an identity image set in response to detection of the identity image setting operation, the identity image set including at least one identity image to be selected. The second detection module 23 is configured to detect selection operation over the identity image to be selected. The setting module 24 is configured to set, in response to detection of the selection operation, an identity image of the target account according to a target image indicated by the selection operation.

Figure 7:
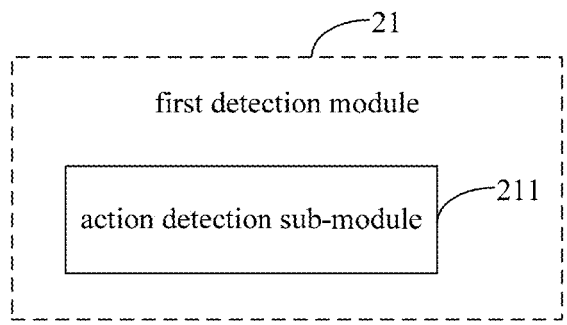
FIG. 7 is a block diagram of another device for setting an identity image of an account, according to an exemplary embodiment of the present disclosure.

FIG. 7 is a block diagram of another device for setting an identity image of an account, according to an exemplary embodiment. Based on the embodiment shown in FIG. 6, the first detection module 21 may include: an action detection sub-module 211, configured to sense action information triggered by a user on an application display interface of the target account.

Figure 8:
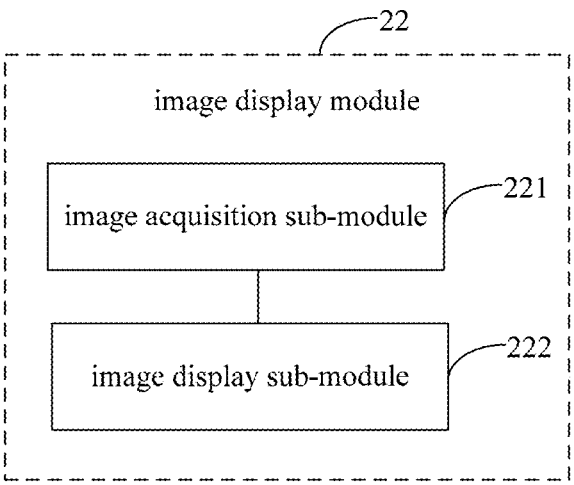
FIG. 8 is a block diagram of still another device for setting an identity image of an account, according to an exemplary embodiment of the present disclosure.

FIG. 8 is a block diagram of still another device for setting an identity image of an account, according to an exemplary embodiment. Based on the embodiment shown in FIG. 7, the image display module 22 may include: an image acquisition sub-module 221, configured to, if the action information triggered by the user matches with preset action information, acquire the identity image set; and an image display sub-module 222, configured to display the identity image to be selected in the identity image set on a current display interface.

Figure 9:
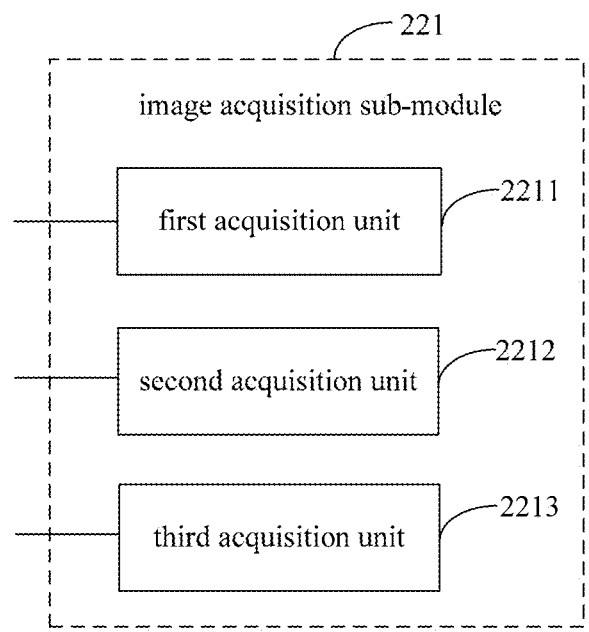
FIG. 9 is a block diagram of yet another device for setting an identity image of an account, according to an exemplary embodiment of the present disclosure.

FIG. 9 is a block diagram of yet another device for setting an identity image of an account, according to an exemplary embodiment. Based on the embodiment shown in FIG. 8, the image acquisition sub-module 221 includes at least one of the following units:

a first acquisition unit 2211, configured to query a local image database to acquire an identity image set;

a second acquisition unit 2212, configured to acquire an identity image set formed by historical identity images from an application server of the target account; and a third acquisition unit 2213, configured to acquire an identity image set from an application server of an associated account of the target account.

Figure 10:
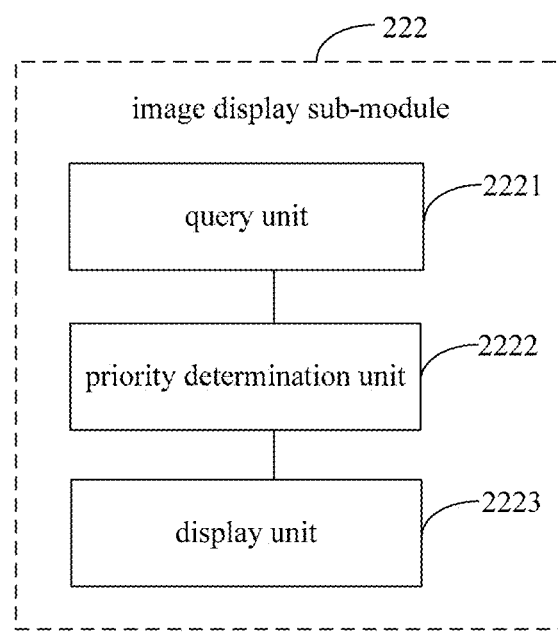
FIG. 10 is a block diagram of yet another device for setting an identity image of an account, according to an exemplary embodiment of the present disclosure.

FIG. 10 is a block diagram of yet another device for setting an identity image of an account, according to an exemplary embodiment, and based on the embodiment shown in FIG. 8, the image display sub-module 222 may include:

a query unit 2221, configured to query historical used times of each of the at least one identity image to be selected used as an identity image in the identity image set;

a priority determination unit 2222, configured to determine display priority of each of the at least one identity image to be selected according to the historical used times; and a display unit 2223, configured to display each of the at least one identity image to be selected in the identity image set from high to low display priority.

Figure 11:
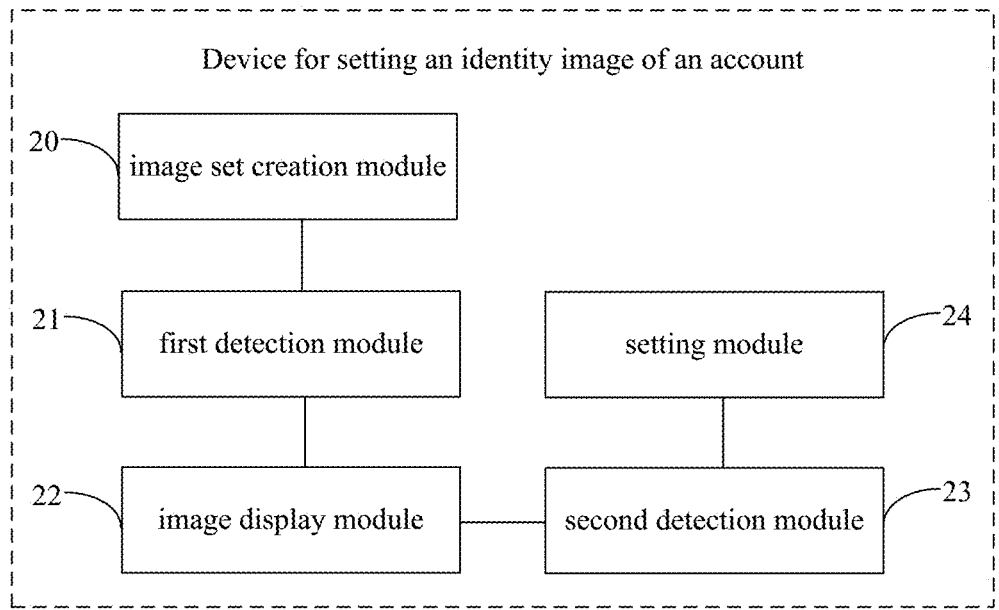
FIG. 11 is a block diagram of yet another device for setting an identity image of an account, according to an exemplary embodiment of the present disclosure.

FIG. 11 is a block diagram of yet another device for setting an identity image of an account, according to an exemplary embodiment. Based on the embodiment shown in FIG. 6, the device may further include: an image set creation module 20, configured to create the identity image set.

Figure 12:
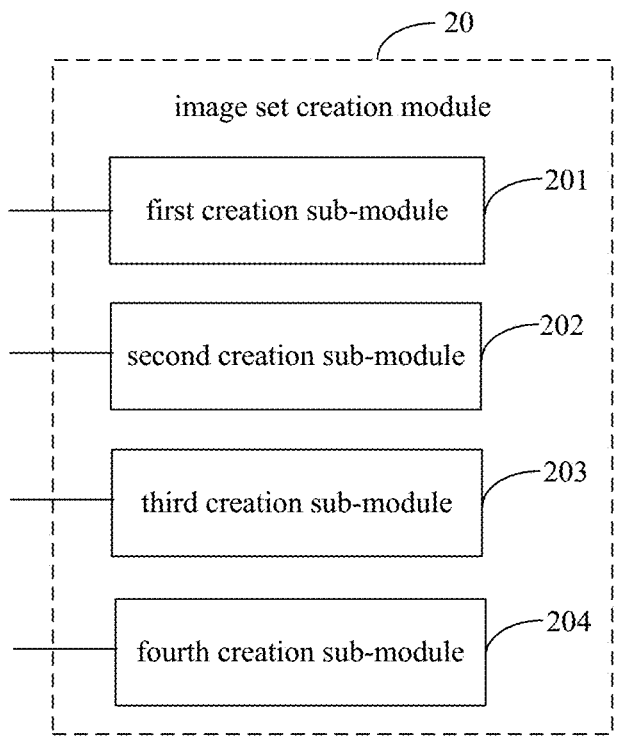
FIG. 12 is a block diagram of yet another device for setting an identity image of an account, according to an exemplary embodiment of the present disclosure.

FIG. 12 is a block diagram of yet another device for setting an identity image of an account, according to an exemplary embodiment. Based on the embodiment shown in FIG. 11, the image set creation module 20 may include at least one of following sub-modules:

a first creation sub-module 201, configured to, when it is detected that the user enables a selfie mode, create the identity image set according to at least one selfie;

a second creation sub-module 202, configured to, when it is detected that the number of similar images in an image database reaches a preset threshold value, create the identity image set according to the similar images;

a third creation sub-module 203, configured to, when the user selects an image as an identity image of an account, create the identity image set on the basis of the image selected as the identity image; and a fourth creation sub-module 204, configured to create the identity image set according to a selected image, in response to detection of preset operation for creation of the identity image set.

Figure 13:
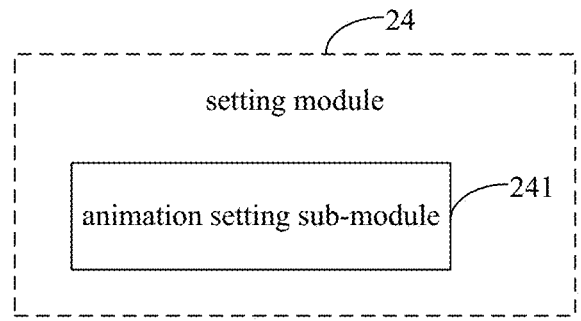
FIG. 13 is a block diagram of yet another device for setting an identity image of an account, according to an exemplary embodiment of the present disclosure.

FIG. 13 is a block diagram of yet another device for setting an identity image of an account, according to an exemplary embodiment. Based on the embodiment shown in FIG. 6, the setting module 24 may include: an animation setting sub-module 241, configured to, under a condition that there are at least two target images, set a target animation according to the at least two target images, the target animation including: displaying the at least two target images in order according to a preset sequence.

The identity image of the target account in the present disclosure may be a portrait, a call show or the like of the target account. In a call show, the calling terminal device may select a photo or other icon to be displayed on the called terminal device, where the photo or icon may include a still image or an animate image.

The device embodiments substantially correspond to the method embodiments, so that related parts may refer to part of descriptions in the method embodiments. The device embodiments described above are only schematic, wherein the units described as separate parts may be or may not be physically separated, and the parts displayed as units may be or may not be physical units, that is, they may be positioned in the same place, or may be distributed to multiple network units. Part or all of the modules therein may be selected to achieve the purpose of the solutions of the present disclosure according to a practical requirement. Those skilled in the art may understand and implement the technical solutions without creative work.

The present disclosure further provides a device for setting an identity image of an account, which includes: a processor; and a memory configured to store instructions executable by the processor, wherein the processor is configured to: detect identity image setting operation for a target account; display an identity image set in response to detection of the identity image setting operation, the identity image set including at least one identity image to be selected; detect selection operation over the at least one identity image to be selected; and set, in response to detection of the selection operation, an identity image of the target account according to a target image indicated by the selection operation.

Figure 14:
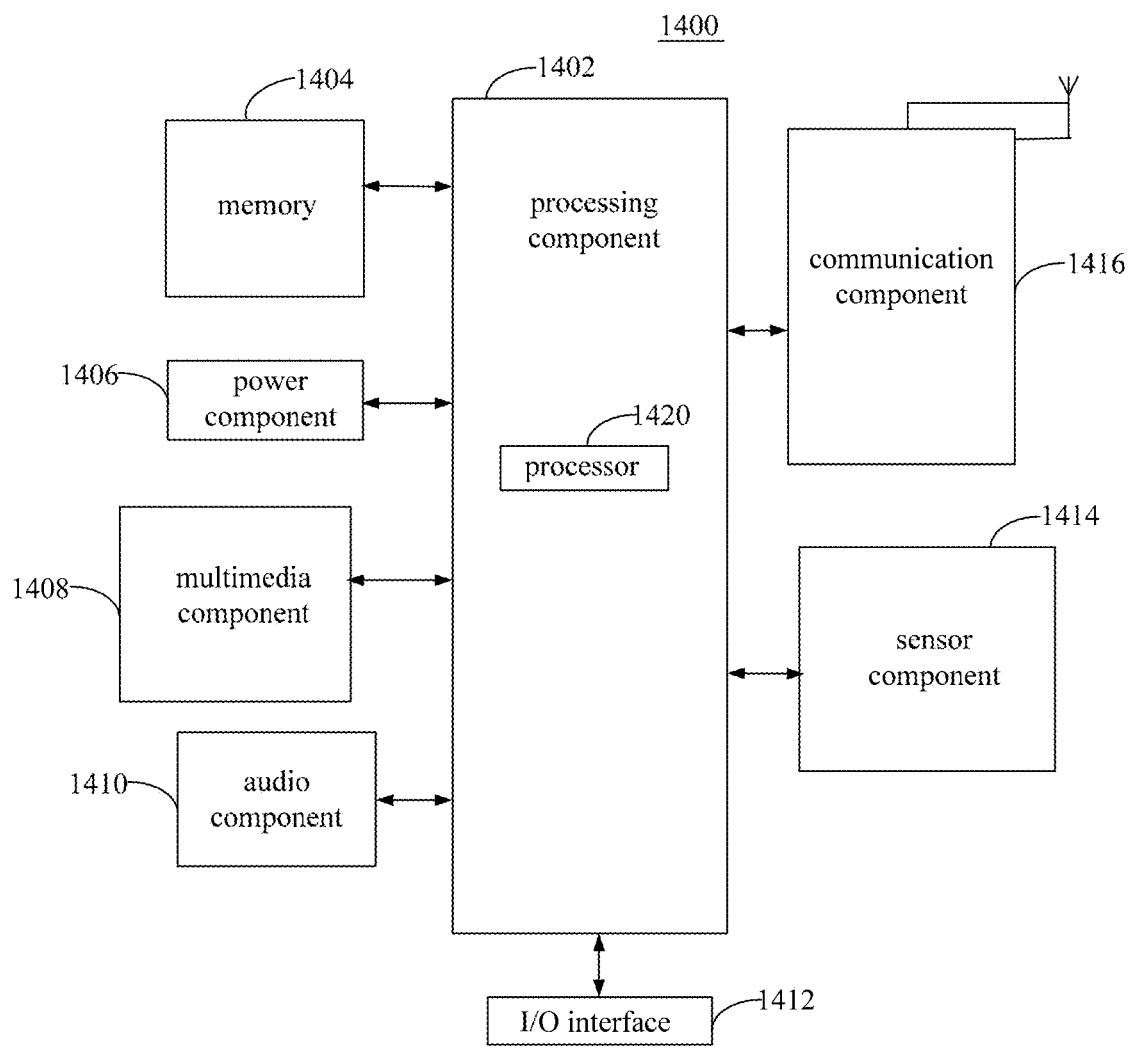
FIG. 14 is a structure diagram of a device for setting an identity image of an account, according to an exemplary embodiment of the present disclosure.

FIG. 14 is a block diagram of a device 1400 for setting an identity image of an account, according to an exemplary embodiment. For example, the device 1400 may be a terminal, specifically, it may be a mobile phone, a computer, a digital broadcast terminal, a messaging device, a gaming console, a tablet, a medical device, an exercise device, a PDA and a wearable device such as a smart watch, smart glasses, a smart band and smart shoes.

Referring to FIG. 14, the device 1400 may include one or more of the following components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the abovementioned methods. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any application programs or methods operated on the device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 provides power for various components of the device 1400. The power component 1406 may include a power management system, one or more power supplies, and other components associated with the generation, management and distribution of power for the device 1400.

The multimedia component 1408 includes a screen providing an output interface between the device 1400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 includes a Microphone (MIC), and the MIC is configured to receive an external audio signal when the device 1400 is in the operation mode, such as a call mode, a recording mode and a voice recognition mode. The received audio signal may be further stored in the memory 1404 or sent through the communication component 1416. In some embodiments, the audio component 1410 further includes a speaker configured to output the audio signal.

The I/O interface 1412 provides an interface between the processing component 1402 and a peripheral interface module, wherein the peripheral interface module may be a keyboard, a click wheel, a button and the like. The button may include, but is not limited to: a home button, a volume button, a starting button and a locking button.

The sensor component 1414 includes one or more sensors configured to provide status assessment in various aspects for the device 1400. For instance, the sensor component 1414 may detect an on/off status of the device 1400 and relative positioning of components, such as a display and a small keyboard of the device 1400. The sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or a Charge Coupled Device (CCD) image sensor, configured for use in an imaging application. In some embodiments, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and another device. The device 1400 may access a communication-standard-based wireless network, such as a Wireless Fidelity (Wi-Fi) network, a 2nd-Generation (2G) or a 3rd-Generation (3G) network or a combination thereof. In an exemplary embodiment, the communication component 1416 receives a broadcast signal or broadcast associated information from an external broadcast management system through a broadcast channel. In an exemplary embodiment, the communication component 1416 further includes a Near Field Communication (NFC) module to facilitate short-range communication. For example, the NFC module may be implemented on the basis of a Radio Frequency Recognition (RFID) technology, an Infrared Data Association (IrDA) technology, an Ultra-WideBand (UWB) technology, a BlueTooth (BT) technology and other technologies.

In an exemplary embodiment, the device 1400 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 1400 may use the circuitries in combination with the other hardware or software components for performing the above described methods. Each module, sub-module, unit, or sub-unit in the disclosure may be implemented at least partially using the one or more circuitries.

In an exemplary embodiment, there is also provided a non-transitory computer-readable storage medium including instructions, such as the memory 1404 including instructions, wherein the instructions may be executed by the processor 1420 of the device 1400 to implement the above-mentioned methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method, comprising:
    detecting an identity image setting operation for a target account;
    displaying an identity image set in response to detection of the identity image setting operation, wherein the identity image set comprises at least one identity image to be selected,
    wherein displaying the identity image set in response to detection of the identity image setting operation comprises:
        acquiring the identity image set from an application server of an associated account of the target account, wherein a user terminal locally stores an associated list of the target account, and the associated account is determined by the associated list;
    detecting a selection operation over the at least one identity image to be selected; and
    setting, in response to detection of the selection operation, an identity image of the target account according to a target image indicated by the selection operation,
    wherein the method further comprises: creating the identity image set by performing following steps:
    when it is detected that a number of similar images in an image database reaches a preset threshold value, creating the identity image set according to the similar images, wherein the preset threshold value corresponds to a percent of the similar images in the image database; and
    when a user selects an image as an identity image of an account with which the user logs on an application on the user terminal, creating the identity image set locally stored in the user terminal on the basis of the image selected as the identity image, for subsequent use by each application account on the user terminal, wherein the selected image is classified into the identity image set by the user terminal and the identity image set is a locally stored identity image set formed by the user terminal by automatically storing each identity image used for each application account of each application previously running on the user terminal.

2. The method according to claim 1, wherein detecting the identity image setting operation for the target account comprises: sensing action information triggered by the user on an application display interface of the target account.

3. The method according to claim 2, wherein displaying the identity image set in response to detection of the identity image setting operation comprises:
    when the action information triggered by the user matches with preset action information, acquiring the identity image set; and
    displaying the at least one identity image to be selected in the identity image set on a current display interface.

4. The method according to claim 3, wherein acquiring the identity image set further comprises at least one of following steps:
    querying a local image database to acquire the identity image set; or
    acquiring, from an application server of the target account, the identity image set formed by historical identity images.

5. The method according to claim 3, wherein displaying the at least one identity image to be selected in the identity image set on the current display interface comprises:
    querying, in the identity image set, historical used times of each of the at least one identity image to be selected used as an identity image;
    the historical used times; and
    displaying each of the at least one identity image to be selected in the identity image set from high to low display priority.

6. The method according to claim 1, wherein the creating the identity image set further comprising:
when it is detected that a user enables a selfie mode, creating the identity image set according to at least one selfie.

7. The method according to claim 1, wherein setting the identity image of the target account according to the target image indicated by the selection operation comprises:
when there are at least two target images, setting a target animation according to the at least two target images, wherein the target animation comprises: displaying the at least two target images in order according to a preset sequence.

8. The method according to claim 1, wherein the identity image comprises at least one of: a portrait and a call show.

9. The method according to claim 1, wherein the associated account is another account that is in the same application as the target account and has a binding relationship with the target account.

10. A device, comprising:
a processor; and
a memory for storing instructions executable by the processor,
wherein the processor is configured to:
detect an identity image setting operation for a target account;
display an identity image set in response to detection of the identity image setting operation, the identity image set comprising at least one identity image to be selected,
wherein the processor is further configured to display the identity image set in response to detection of the identity image setting operation by performing following step:
acquiring the identity image set from an application server of an associated account of the target account, wherein a user terminal locally stores an associated list of the target account, and the associated account is determined by the associated list;
detect selection operation over the identity image to be selected; and
set, in response to detection of the selection operation, an identity image of the target account according to a target image indicated by the selection operation,
wherein the processor is further configured to create the identity image set by performing following steps:
when it is detected that a number of similar images in an image database reaches a preset threshold value, creating the identity image set according to the similar images, wherein the preset threshold value corresponds to a percent of the similar images in the image database; and
when the user selects an image as an identity image of an account with which the user logs on an application on the user terminal, creating the identity image set locally stored in the user terminal on the basis of the image selected as the identity image, for subsequent use by each application account on the user terminal, wherein the selected image is classified into the identity image set by the user terminal and the identity image set is a locally stored identity image set formed by the user terminal by automatically storing each identity image used for each application account of each application previously running on the user terminal.

11. The device according to claim 10, wherein the processor is further configured to sense action information triggered by a user on an application display interface of the target account.

12. The device according to claim 11, wherein the processor is further configured to:
when the action information triggered by the user matches with preset action information, acquire the identity image set; and
display the at least one identity image to be selected in the identity image set on a current display interface.

13. The device according to claim 12, wherein the processor is further configured to: query a local image database to acquire the identity image set; or
acquire, from an application server of the target account, the identity image set formed by historical identity images.

14. The device according to claim 12, wherein the processor is further configured to:
query, in the identity image set, historical used times of each of the at least one identity image to be selected used as an identity image;
determine display priority of each of the at least one identity image to be selected according to the historical used times; and
display each of the at least one identity image to be selected in the identity image set from high to low display priority.

15. The device according to claim 10, wherein the processor is further configured to create the identity image set by performing following step:
when it is detected that a user enables a selfie mode, creating the identity image set according to at least one selfie.

16. The device according to claim 10, wherein the processor is further configured to:
under a condition that there are at least two target images, set a target animation according to the at least two target images, wherein the target animation comprises: displaying the at least two target images in order according to a preset sequence.

17. The device according to claim 10, wherein the identity image comprises at least one of: a portrait and a call show.

18. A non-transitory computer-readable storage medium having stored therein instructions that, when executed by a processor of a user terminal, causes the user terminal to perform acts comprising:
detecting an identity image setting operation for a target account;
displaying an identity image set in response to detection of the identity image setting operation, wherein the identity image set comprises at least one identity image to be selected,
wherein displaying the identity image set in response to detection of the identity image setting operation comprises:
acquiring the identity image set from an application server of an associated account of the target account, wherein the user terminal locally stores an associated list of the target account, and the associated account is determined by the associated list;
detecting selection operation over the at least one identity image to be selected;
setting, in response to detection of the selection operation, an identity image of the target account according to a target image indicated by the selection operation; and creating the identity image set by performing following steps:

when it is detected that a number of similar images in an image database reaches a preset threshold value, creating the identity image set according to the similar images, wherein the preset threshold value corresponds to a percent of the similar images in the image database; and when a user selects an image as an identity image of an account with which the user logs on an application on a user terminal, creating the identity image set locally stored in the user terminal on the basis of the image selected as the identity image, for subsequent use by each application account on the user terminal, wherein the selected image is classified into the identity image set by the user terminal and the identity image set is a locally stored identity image set formed by the user terminal by automatically storing each identity image used for each application account of each application previously running on the user terminal.

19. The non-transitory computer-readable storage medium according to claim 18, wherein the acts further comprise:

sensing action information triggered by the user on an application display interface of the target account;

when the action information triggered by the user matches with preset action information, acquiring the identity image set; and displaying the at least one identity image to be selected in the identity image set on a current display interface.

20. The non-transitory computer-readable storage medium according to claim 18, wherein the acts further comprise: querying a local image database to acquire the identity image set; or acquiring, from an application server of the target account, the identity image set formed by historical identity images.

* * * * *